United States Patent
Kimura et al.

(10) Patent No.: US 11,290,275 B2
(45) Date of Patent: Mar. 29, 2022

(54) AUTHENTICATION APPARATUS

(71) Applicants: Kabushiki Kaisha Toshiba, Tokyo (JP); Toshiba Electronic Devices & Storage Corporation, Tokyo (JP)

(72) Inventors: Masahiro Kimura, Kanagawa (JP); Yoshinari Ojima, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 615 days.

(21) Appl. No.: 16/291,009

(22) Filed: Mar. 4, 2019

(65) Prior Publication Data

US 2020/0092100 A1    Mar. 19, 2020

(30) Foreign Application Priority Data

Sep. 19, 2018   (JP) ............... JP2018-175380

(51) Int. Cl.
  *H04L 9/32*   (2006.01)
  *H04L 29/06*  (2006.01)
  *G06F 7/58*   (2006.01)

(52) U.S. Cl.
  CPC .......... *H04L 9/321* (2013.01); *H04L 63/1491* (2013.01); *G06F 7/588* (2013.01)

(58) Field of Classification Search
  CPC ... H04L 9/321; H04L 63/1491; H04L 9/0662; G06F 7/588; G06F 2221/2135; G06F 21/554
  See application file for complete search history.

(56) References Cited

U.S. PATENT DOCUMENTS

| | | | |
|---|---|---|---|
| 6,145,053 A | 11/2000 | Smith | |
| 7,757,295 B1* | 7/2010 | Hadaaegh | G06F 21/552 726/26 |
| 8,990,578 B2 | 3/2015 | Sawamura | |
| 9,439,070 B2 | 9/2016 | Sugiyama et al. | |
| 2010/0202608 A1* | 8/2010 | Furuhashi | H04L 9/0894 380/44 |

FOREIGN PATENT DOCUMENTS

| | | |
|---|---|---|
| JP | 2001-282739 A | 10/2001 |
| JP | 3356422 B | 10/2002 |
| JP | 2002-342279 A | 11/2002 |
| JP | 2003-198625 A | 7/2003 |
| JP | 2004-506250 A | 2/2004 |
| JP | 3618245 B | 11/2004 |
| JP | 2007-011710 A | 1/2007 |
| JP | 2013-142917 A | 7/2013 |
| JP | 2015-207241 A | 11/2015 |

\* cited by examiner

*Primary Examiner* — Huan V Doan
(74) *Attorney, Agent, or Firm* — Allen & Overy LLP (57) ABSTRACT

An authentication apparatus of embodiments has a counter circuit and a pseudo-pass generating circuit. The counter circuit counts the number of times an inputted cryptographic key and a cryptographic key set in advance consecutively do not match. The pseudo-pass generating circuit outputs a pseudo-pass response when the number of times the keys consecutively do not match, which is counted by the counter circuit, exceeds a predetermined value.

6 Claims, 6 Drawing Sheets

AUTHENTICATION APPARATUS

CROSS-REFERENCE TO RELATED APPLICATION

This application is based upon and claims the benefit of priority from the prior Japanese Patent Application No. 2018-175380 filed on Sep. 19, 2018; the entire contents of which are incorporated herein by reference.

FIELD

Embodiments described herein relate generally to an authentication apparatus.

BACKGROUND

Recently, home electrical appliances, cars and the like have begun to be connected to the Internet with development of the Internet of Things (IoT). Along with this, a possibility that the home electrical appliances, cars and the like connected to the Internet are illegally accessed by a malicious third party such as a hacker is increasing.

For example, when a microcode (a program) for causing a mounted microcomputer to operate is rewritten by being illegally accessed with a brute force attack (hereinafter abbreviated as BFA) or the like trying all possible combinations for a password and the like, there is a possibility that a processor performs an operation different from an expected operation.

DETAILED DESCRIPTION

An authentication apparatus of embodiments has a counter circuit and a pseudo-pass generating circuit. The counter circuit counts the number of times an inputted cryptographic key and a cryptographic key set in advance consecutively do not match. The pseudo-pass generating circuit outputs a pseudo-pass response when the number of times the keys consecutively do not match, which is counted by the counter circuit, exceeds a predetermined value. The embodiments will be described below in detail with reference to drawings.

First Embodiment

First, based on FIG. 1, a configuration of an authentication apparatus according to a first embodiment will be described.

Figure 1:
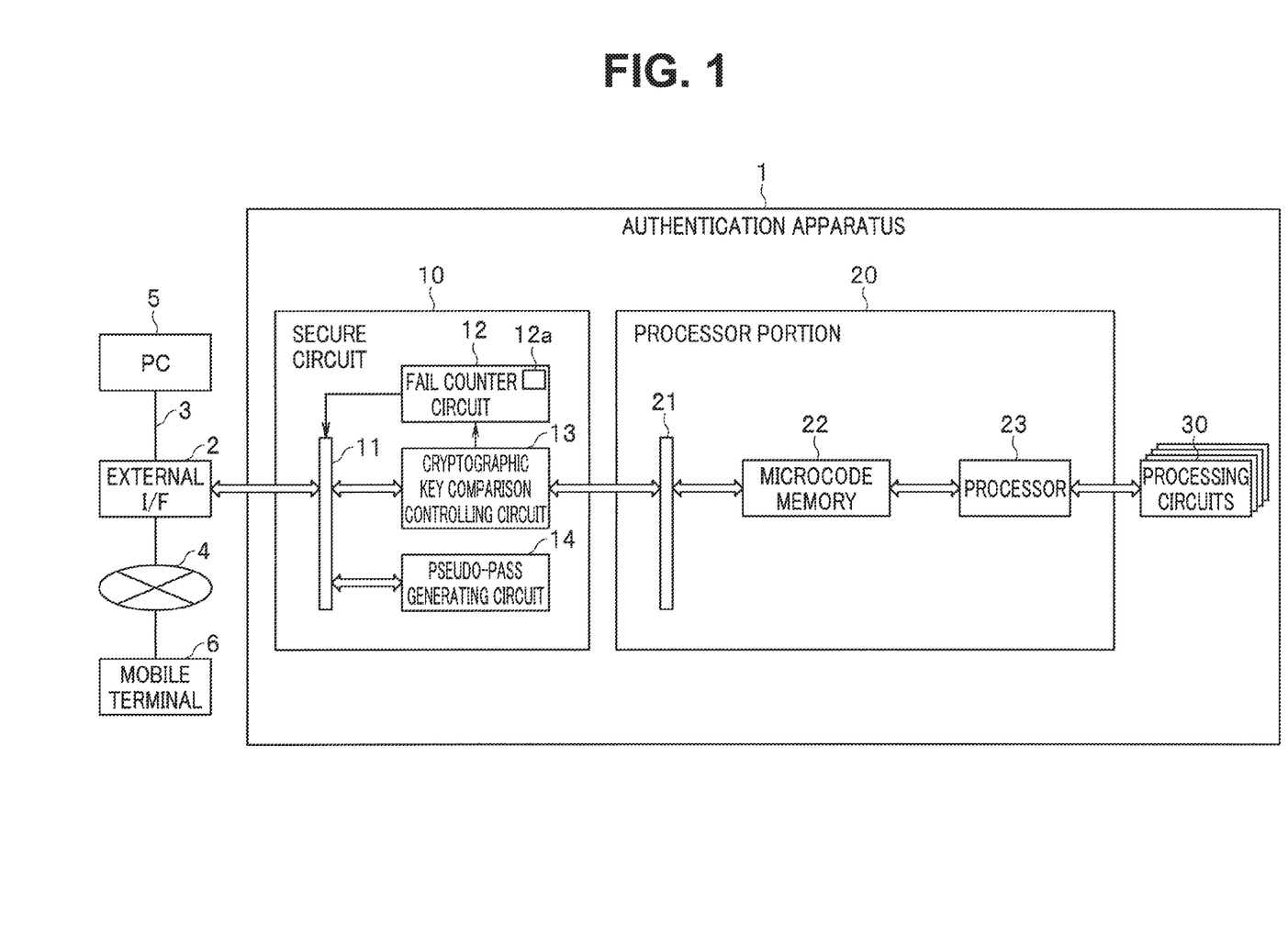
FIG. 1 is a block diagram showing an example of a configuration of an authentication apparatus according to a first embodiment.

FIG. 1 is a block diagram showing an example of the configuration of the authentication apparatus according to the first embodiment.

As shown in FIG. 1, an authentication apparatus 1 is configured having a secure circuit 10, a processor portion 20 and a plurality of processing circuits 30. The authentication apparatus 1 is connected to an external interface (hereinafter abbreviated as an I/F) 2. The external I/F 2 is connected to, for example, a LAN cable 3, the Internet 4 or the like. A user can access the authentication apparatus 1 using a personal computer (hereinafter abbreviated as a PC) 5 connected to the LAN cable 3 or a mobile terminal 6 or the like connected to the Internet 4 and cause the processor portion 20 to execute a desired process.

The secure circuit 10 is configured having an internal I/F 11, a fail counter circuit 12, a cryptographic key comparison controlling circuit 13 and a pseudo-pass generating circuit 14. The fail counter circuit 12 has a random number generating circuit 12a.

The processor portion 20 is configured having a memory controlling circuit 21, a microcode memory 22 and a processor 23. The memory controlling circuit 21 controls a read function and a write function of reading from and writing to the microcode memory 22. A microcode (a program) for executing a desired process is stored in the microcode memory 22. The processor 23 executes the microcode stored in the microcode memory 22 to cause the processing circuits 30 to execute a desired process.

At the time of accessing the authentication apparatus 1, for example, using the mobile terminal 6, the user sets a cryptographic key and transmits the cryptographic key to the authentication apparatus 1. The cryptographic key is inputted to the cryptographic key comparison controlling circuit 13 via the external I/F 2 and the internal I/F 11.

The cryptographic key comparison controlling circuit 13 performs comparison about whether the inputted cryptographic key matches a cryptographic key set in advance. If the inputted cryptographic key and the cryptographic key set in advance match, the cryptographic key comparison controlling circuit 13 returns a pass response showing that the cryptographic key has passed to the mobile terminal 6. The user is thereby enabled to access the processor portion 20, and the user can cause the processor 23 to execute the microcode (program) stored in the microcode memory 22 to execute a desired process by the processing circuits 30.

If the inputted cryptographic key and the cryptographic key set in advance do not match, the cryptographic key comparison controlling circuit 13 returns an error response showing that the access has failed to the mobile terminal 6. If the error response is returned, the user cannot access the processor portion 20.

Thus, the secure circuit 10 is adapted to permit access to the processor portion 20 for causing the system to operate by returning a pass response to normal access, and block access to the processor portion 20 by returning an error response to illegal access.

Here, description will be made on a case where a malicious third party such as a hacker illegally gain access using BFA or the like. Note that, in the description below, the malicious third party such as a hacker will be called an illegal user.

At the time of accessing the authentication apparatus 1, for example, using the PC 5, the illegal user sets a cryptographic key and transmits the cryptographic key to the authentication apparatus 1. As described above, if the inputted cryptographic key and a cryptographic key set in advance do not match, the authentication apparatus 1 returns an error response. Since the error response is returned, the illegal user knows that the set cryptographic key does not match the cryptographic key set in advance. It becomes possible for the illegal user to, by repeatedly trying possible combinations for a cryptographic key, obtain a cryptographic key to which a pass response is returned (in other words, a cryptographic key to which an error response is not returned).

As a result, it becomes possible for the illegal user to illegally access the microcode memory 22 by accessing the authentication apparatus 1 using the cryptographic key to which the pass response is returned, and illegally read the microcode information stored in the microcode memory 22. Further, it becomes possible for the illegal user to analyze the read microcode information and write illegal microcode information to the microcode memory 22. Therefore, there is a possibility that the processor 23 performs an operation different from an expected operation.

In the present embodiment, the cryptographic key comparison controlling circuit 13 controls the fail counter circuit 12 to count the number of times the cryptographic key comparison consecutively results in mismatch (fail). The cryptographic key comparison controlling circuit 13 determines whether the number of consecutive mismatches has exceeded a predetermined value (a predetermined number of times), and, if the number of consecutive mismatches has exceeded the predetermined value, controls the pseudo-pass generating circuit 14 to return a pseudo-pass response. That is, the fail counter circuit 12 counts the number of consecutive illegal accesses, and the pseudo-pass generating circuit 14 outputs a pseudo-pass response if the number of consecutive illegal accesses counted by the fail counter circuit 12 has exceeded the predetermined value.

The illegal user tries to access the microcode memory 22 because the pseudo-pass response is returned but cannot access the microcode memory 22 because the pass response is a pseudo-pass response. In this case, the illegal user performs BFA again. As a result, the authentication apparatus 1 can complicate analysis and cause the illegal user to give up the illegal access.

If a certain number of times is fixed as the predetermined value, a pseudo-pass response is outputted every predetermined number of times. For example, if 100 times is fixed as the predetermined value, a pseudo-pass response is returned to the illegal user for every 100 consecutive mismatches. If a pseudo-pass response is regularly returned to the illegal user every certain predetermined number of times, the possibility for the illegal user to detect that the pass response is a pseudo-pass response increases.

Therefore, in the present embodiment, the cryptographic key comparison controlling circuit 13 resets the count value of the fail counter circuit 12 when the number of consecutive mismatches has exceeded the predetermined value. Then, the cryptographic key comparison controlling circuit 13 causes the random number generating circuit 12a to generate a random number to randomly change the predetermined value. Intervals at which pseudo-pass responses are returned to the illegal user become irregular thereby, and it is made difficult for the illegal user to detect that a pass response is a pseudo-pass response.

Figure 2:
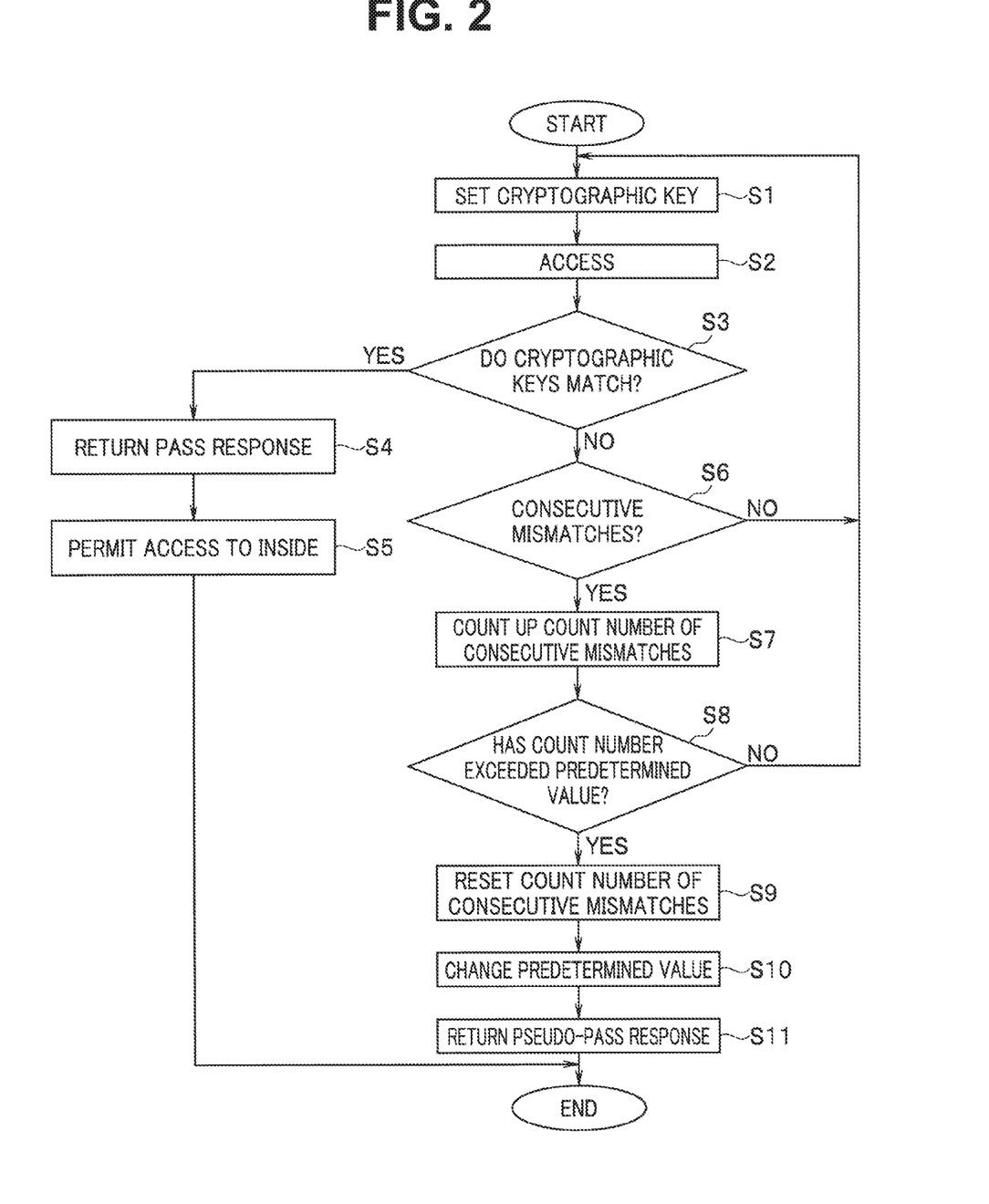
FIG. 2 is a flowchart showing an example of an operation of an authentication apparatus 1 of the first embodiment.

Next, an operation of the authentication apparatus 1 configured as described above will be described. FIG. 2 is a flowchart showing an example of the operation of the authentication apparatus 1 of the first embodiment.

First, the user sets a cryptographic key using the PC 5 or the mobile terminal 6 (S1) and accesses the authentication apparatus 1 (S2). The cryptographic key is thereby inputted to the cryptographic key comparison controlling circuit 13 of the secure circuit 10.

The cryptographic key comparison controlling circuit 13 determines whether the inputted cryptographic key matches a cryptographic key set in advance or not (S3). If the cryptographic key comparison controlling circuit 13 determines that the inputted cryptographic key matches the cryptographic key set in advance (S3: YES), the cryptographic key comparison controlling circuit 13 returns a pass response (S4), permits access to an inside (here, the processor portion 20) (S5) and ends the process.

On the other hand, if the cryptographic key comparison controlling circuit 13 determines that the inputted cryptographic key does not match the cryptographic key set in advance (S3: NO), the cryptographic key comparison controlling circuit 13 determines whether consecutive mismatches have occurred or not (S6). If the cryptographic key comparison controlling circuit 13 determines that consecutive mismatches have not occurred (S6: NO), the cryptographic key comparison controlling circuit 13 returns to the process of S and repeats a similar process. On the other hand, if the cryptographic key comparison controlling circuit 13 determines that consecutive fails have occurred (S6: YES), the cryptographic key comparison controlling circuit 13 controls the fail counter circuit 12 to count up the count number of consecutive mismatches (S7).

Next, the cryptographic key comparison controlling circuit 13 determines whether the count number of consecutive mismatches has exceeded a predetermined value (a predetermined number of times) or not (S8). If the cryptographic key comparison controlling circuit 13 determines that the count number of consecutive mismatches has not exceeded the predetermined value (S8: NO), the cryptographic key comparison controlling circuit 13 returns to the process of S1 and repeats a similar process. On the other hand, if the cryptographic key comparison controlling circuit 13 determines that the count number of consecutive mismatches has exceeded the predetermined value (S8: YES), the cryptographic key comparison controlling circuit 13 controls the fail counter circuit 12 to reset the count number of consecutive mismatches (S9). Next, the cryptographic key comparison controlling circuit 13 controls the random number generating circuit 12a of the fail counter circuit 12 to change the predetermined value (S10). Lastly, the cryptographic key comparison controlling circuit 13 returns a pseudo-pass response (S11) and ends the process.

As described above, the cryptographic key comparison controlling circuit 13 compares an inputted cryptographic key with a cryptographic key set in advance. If the number of consecutive mismatches has exceeded a predetermined value, the cryptographic key comparison controlling circuit 13 determines that the access is illegal access by BFA or the like and returns not an error response but a pseudo-pass response. That is, if the cryptographic key comparison controlling circuit 13 determines that access is illegal access by BFA or the like, the cryptographic key comparison controlling circuit 13 gives false information to the illegal user in order to make the illegal access seem to have passed even though it has not actually passed (a pseudo-pass response). The illegal user tries to access the processor portion 20 with the false information, but the illegal user cannot access the processor portion 20 because the cryptographic key has not actually passed. As a result, access to the inside is complicated, and it is possible to cause the illegal user to give up the illegal access.

Thus, according to the authentication apparatus 1 of the present embodiment, it is possible to complicate analysis against a third party who performs illegal access and cause the third party to give up the illegal access.

If pseudo-pass responses are returned to an illegal user at constant intervals, the illegal user suspects a pseudo-pass response. Therefore, in the present embodiment, the random number generating circuit 12a capable of randomly changing a set value for returning a pseudo-pass response is provided. Intervals at which pseudo-pass responses are returned to the illegal user become irregular thereby, and it is made difficult for the illegal user to detect that a pass response is a pseudo-pass response.

Second Embodiment

Next, a second embodiment will be described.

In the first embodiment, even if a pseudo-pass response is returned, there is a possibility that an illegal user detects that the pass response is a pseudo-pass response because the illegal user cannot access the microcode memory 22 of the processor portion 20.

Therefore, in the second embodiment, a false microcode memory which can be accessed at the time when a pseudo-pass response is provided to prevent it from being detected that the pass response is a pseudo-pass response, so that reading and writing of a microcode from and to the false microcode memory are enabled.

Figure 3:
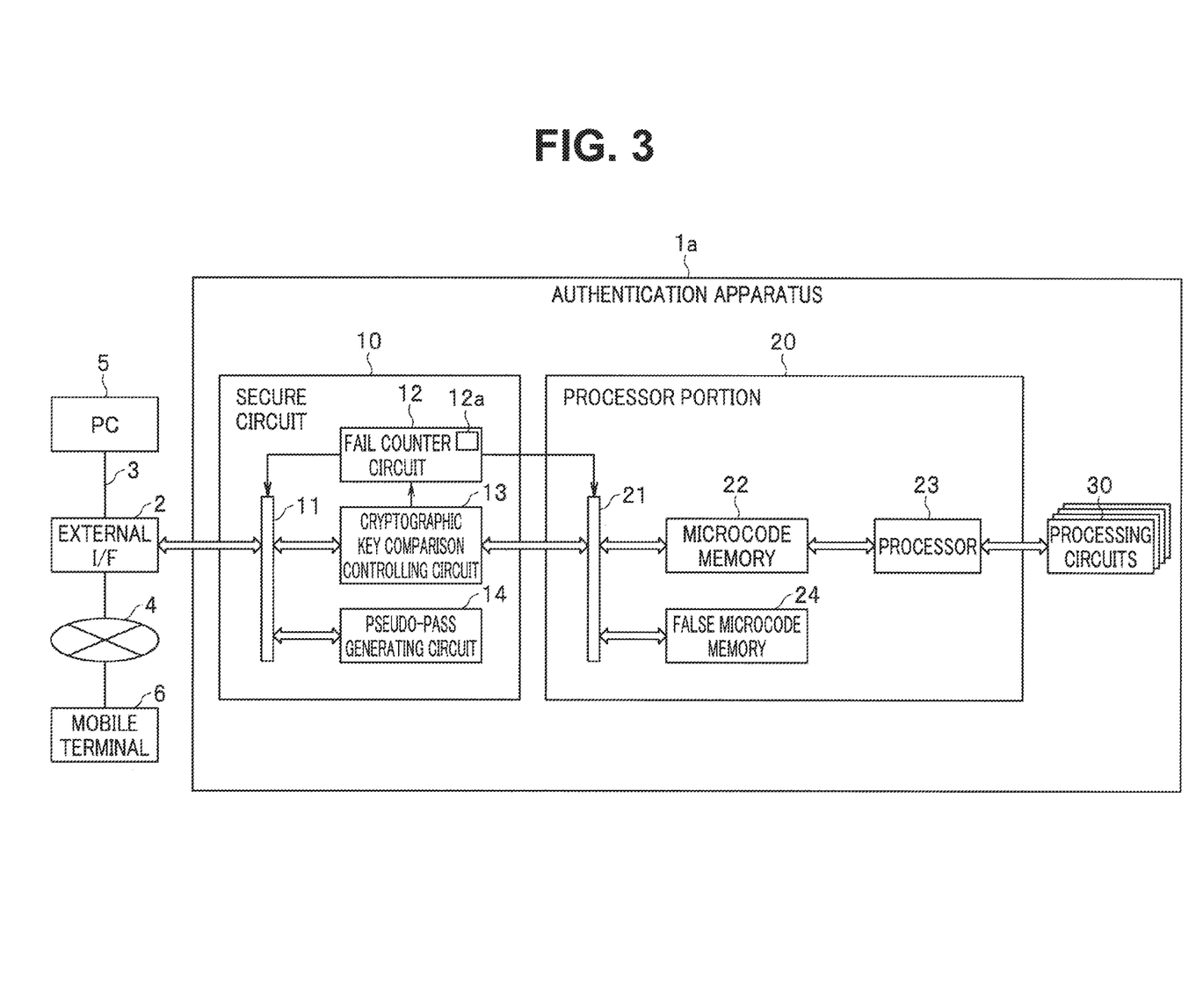
FIG. 3 is a block diagram showing an example of a configuration of an authentication apparatus according to a second embodiment.

FIG. 3 is a block diagram showing an example of a configuration of an authentication apparatus according to the second embodiment. Note that, in FIG. 3, components similar to components of FIG. 1 will be given the same reference numerals, and description of the components will be omitted.

As shown in FIG. 3, an authentication apparatus 1a is configured by adding a false microcode memory 24 to the authentication apparatus 1 of FIG. 1. False microcode information is stored in the false microcode memory 24.

When the cryptographic key comparison controlling circuit 13 returns a pseudo-pass response, the cryptographic key comparison controlling circuit 13 permits access to the false microcode memory 24. As a result, when an illegal user tries to access the microcode memory 22 when the pseudo-pass response is returned, the illegal user accesses the false microcode memory 24. The illegal user reads the false microcode information from the false microcode memory 24 and analyzes the false microcode information. When the illegal user tries to write an illegal microcode to the microcode memory 22, the illegal users actually writes the illegal microcode to the false microcode memory 24. A read function and a write function of reading from and writing to the false microcode memory 24 are controlled by the memory controlling circuit 21.

In this case, since the illegal microcode stored in the false microcode memory 24 is not executed by the processor 23, it does not happen that the processor 23 performs an operation different from an expected operation.

Figure 4:
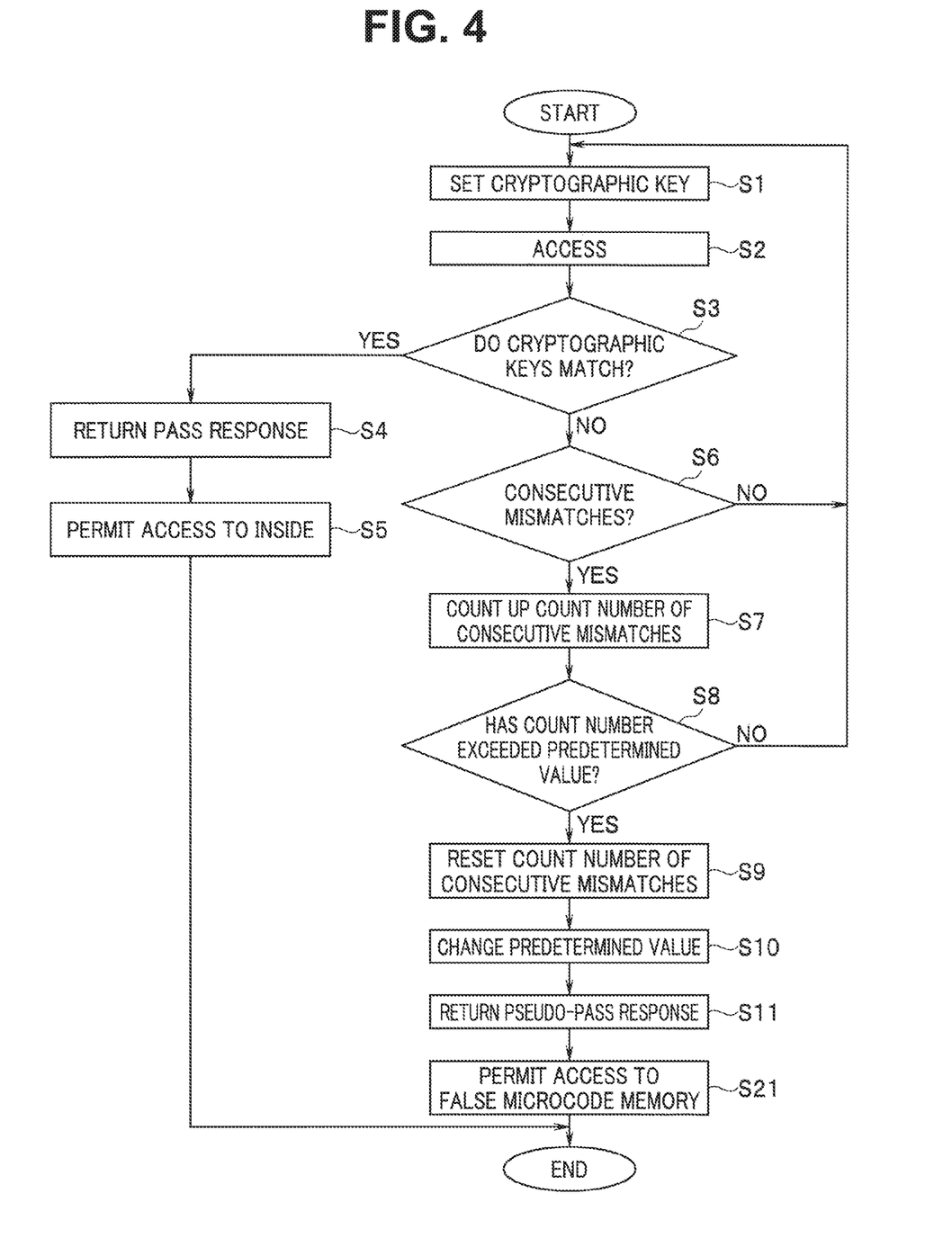
FIG. 4 is a flowchart showing an example of an operation of an authentication apparatus 1a of the second embodiment.

Next, an operation of the authentication apparatus 1a configured as described above will be described. FIG. 4 is a flowchart showing an example of an operation of the authentication apparatus 1a of the second embodiment. Note that, in FIG. 4, components similar to components of FIG. 2 will be given the same reference numerals, and description of the components will be omitted.

When the cryptographic key comparison controlling circuit 13 has returned a pseudo-pass response in the process of S11, the cryptographic key comparison controlling circuit 13 permits access to the false microcode memory 24 (S21) and ends the process.

By the above process, an illegal user can read the false microcode information stored in the false microcode memory 24 and write illegally rewritten microcode information to the false microcode memory 24.

However, the false microcode stored in the false microcode memory 24 or the illegally rewritten microcode is not executed by the processor 23, and it does not happen that the processor portion 20 performs an unintentional operation.

As described above, the authentication apparatus 1a of the present embodiment can complicate analysis more than the authentication apparatus 1 of the first embodiment by permitting an illegal user to access the false microcode memory 24 and can cause the illegal user to give up illegal access.

Third Embodiment

Next, a third embodiment will be described.

In the second embodiment, the false microcode memory 24 which can be accessed when a pseudo-pass response is returned is provided to prevent an illegal user from detecting that the pass response is a pseudo-pass response. In the third embodiment, in order to more surely prevent a pseudo-pass response from being detected to be a pseudo-pass response, a false processor and false processing circuits which operate based on false microcode information when a pseudo-pass response is returned are provided so that a false processing operation is enabled. By causing an illegal user to operate a false system thereby, analysis gets complicated, and the illegal user is caused to give up illegal access.

Figure 5:
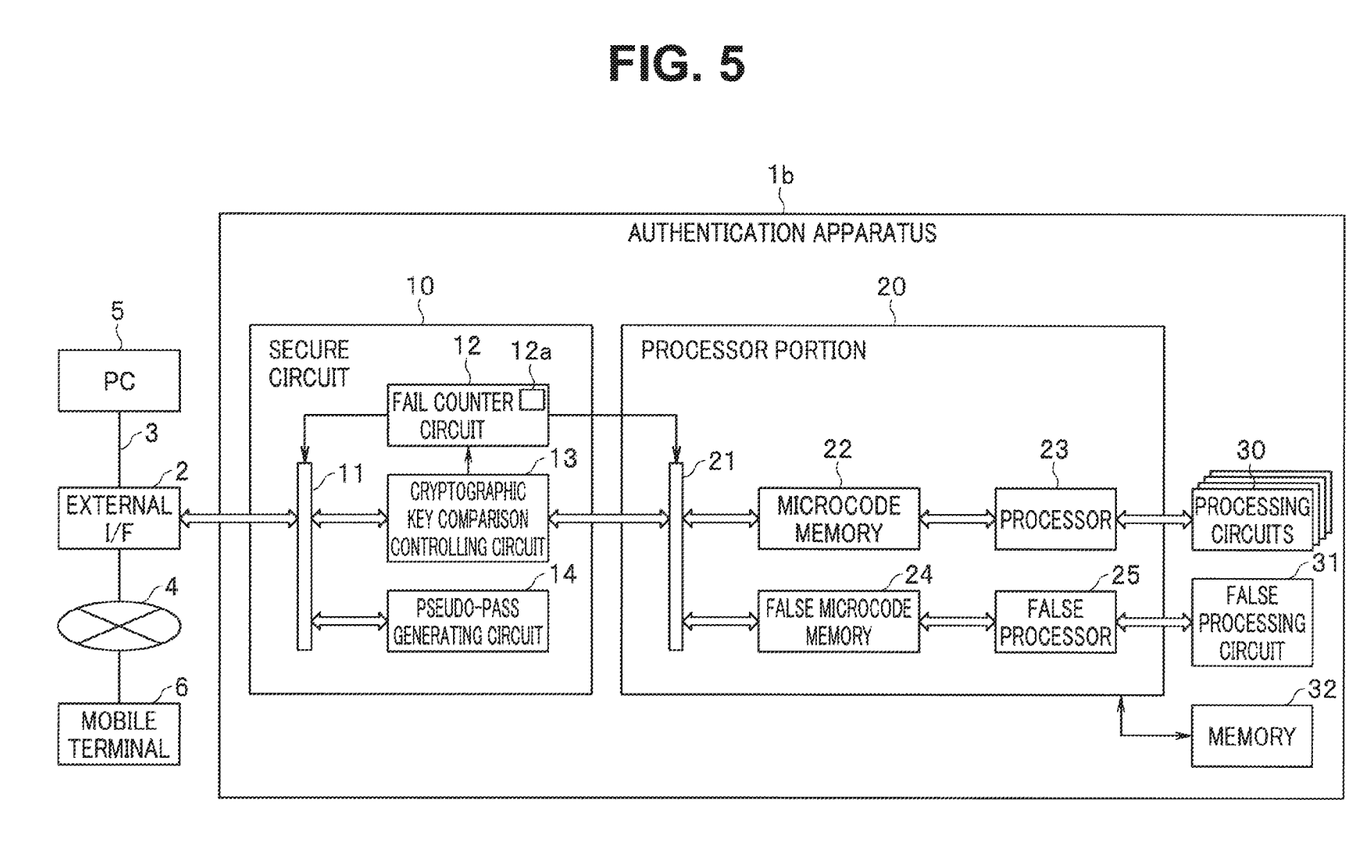
FIG. 5 is a block diagram showing an example of a configuration of an authentication apparatus according to a third embodiment.

FIG. 5 is a block diagram showing an example of a configuration of an authentication apparatus according to the third embodiment. Note that, in FIG. 5, components similar to components of FIG. 3 will be given the same reference numerals, and description of the components will be omitted.

As shown in FIG. 5, an authentication apparatus 1b is configured by adding a false processor 25, false processing circuits 31 and a memory 32 to the authentication apparatus 1a of FIG. 3.

The false processor 25 operates by false microcode information stored in the false microcode memory 24 or illegal microcode information written to the false microcode memory 24 by an illegal user. The false processor 25 can cause the false processing circuit 31 to execute the false microcode information or the illegal microcode to execute a false processing operation. Further, if illegal access has occurred, the false processor 25 can record information showing that the illegal access has occurred, to the memory 32.

Figure 6:
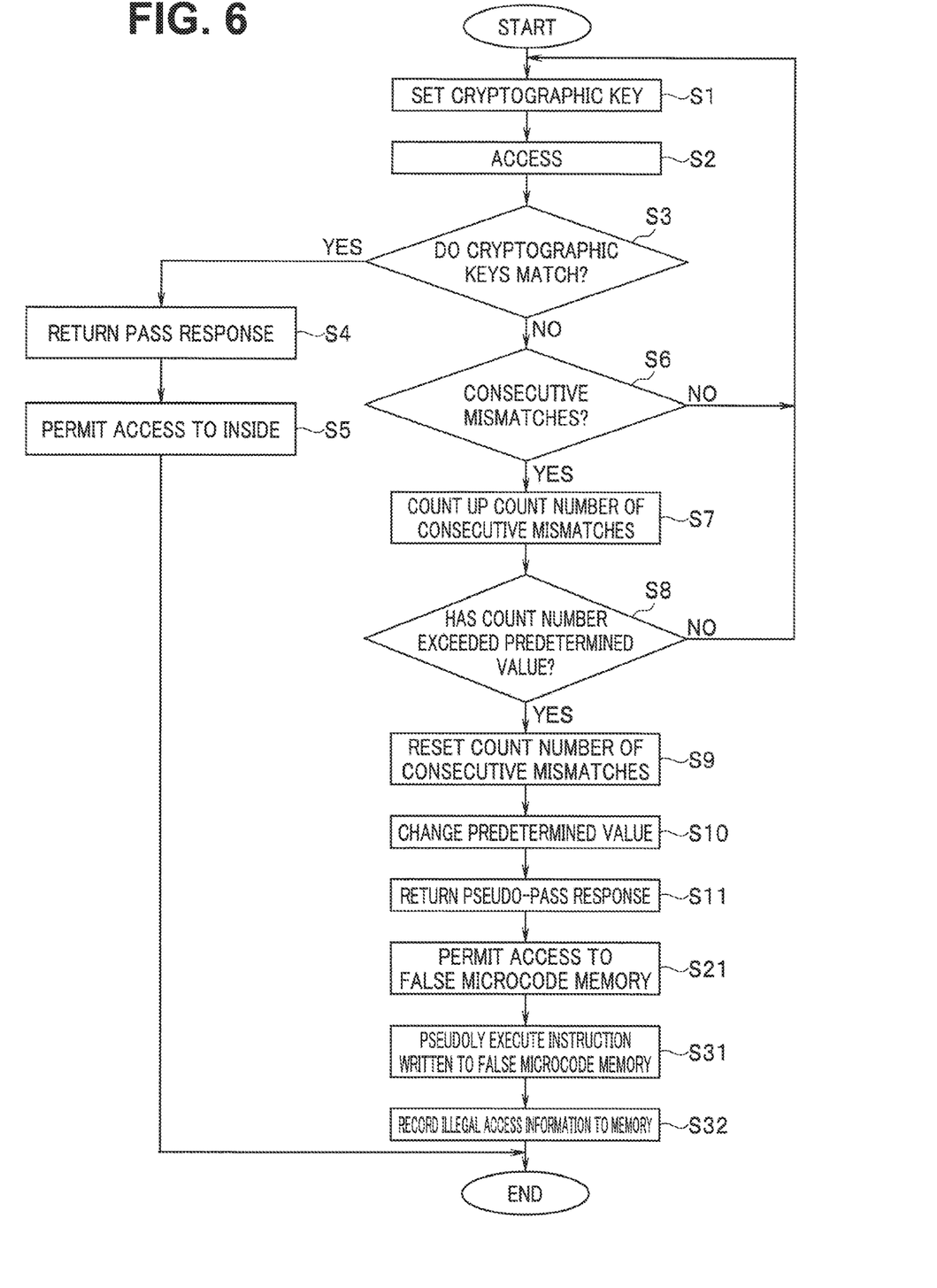
FIG. 6 is a flowchart showing an example of an operation of an authentication apparatus 1b of the third embodiment.

Next, an operation of the authentication apparatus 1b configured as described above will be described. FIG. 6 is a flowchart showing an example of an operation of the authentication apparatus 1b of the third embodiment. Note that, in FIG. 6, components similar to components of FIG. 4 will be given the same reference numerals, and description of the components will be omitted.

When the cryptographic key comparison controlling circuit 13 permits access to the false microcode memory 24 in the process of S21, the false processor 25 pseudoly executes an instruction written to the false microcode memory 24 (S31). Then, the false processor 25 records illegal access information to the memory 32 (S32) and ends the process.

By the above process, the illegal user can cause the false processor 25 to execute the false microcode information stored in the false microcode memory 24 or the illegally rewritten microcode information.

However, since a processing operation executed by the false processor 25 is a false processing operation, it does not happen that the processor portion 20 performs an unintentional operation.

As described above, the authentication apparatus 1b of the present embodiment can complicate analysis more than the authentication apparatus 1a of the second embodiment by causing an illegal user to execute a false processing operation and can cause the illegal user to give up the illegal access.

Note that, for the respective steps in each flowchart of the present specification, execution order may be changed, a plurality of steps may be simultaneously executed, or the steps may be executed in different order each time of execution, unless contrary to the nature thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An authentication apparatus comprising:
   a counter circuit configured to count a number of times an inputted cryptographic key and a cryptographic key set in advance consecutively do not match; and
   a pseudo-pass generating circuit configured to output a pseudo-pass response when the number of times the keys consecutively do not match, which is counted by the counter circuit, exceeds a predetermined value.

2. The authentication apparatus according to claim 1, further comprising a comparison controlling circuit configured to perform comparison about whether the inputted cryptographic key and the cryptographic key set in advance match or not; wherein
   as a result of the comparison by the comparison controlling circuit, the counter circuit counts the number of times the inputted cryptographic key and the cryptographic key set in advance are consecutively determined not to match; and
   the pseudo-pass generating circuit outputs a pseudo-pass response if the number of times the keys are consecutively determined not to match exceeds the predetermined value.

3. The authentication apparatus according to claim 2, further comprising a false microcode memory storing a false microcode; wherein
   when the pseudo-pass response is outputted from the pseudo-pass generating circuit, the comparison controlling circuit permits access to the false microcode memory.

4. The authentication apparatus according to claim 3, further comprising a memory controlling circuit configured to control a read function and a write function of reading from and writing to the false microcode memory.

5. The authentication apparatus according to claim 4, further comprising:
   a false processor configured to operate by the false microcode stored in the false microcode memory; and
   a false processing circuit configured to execute a false processing operation based on the false microcode by control by the false processor.

6. The authentication apparatus according to claim 1, wherein
   the counter circuit comprises a random number generator capable of randomly changing the predetermined value.

* * * * *